US012444329B2

(12) United States Patent
Pericone

(10) Patent No.: US 12,444,329 B2
(45) Date of Patent: Oct. 14, 2025

(54) REFLECTIVE MARKER FOR INDICATING LOCATION OF A NEARBY FIRE HYDRANT

(71) Applicant: Brian Jeffrey Pericone, Eatontown, NJ (US)

(72) Inventor: Brian Jeffrey Pericone, Eatontown, NJ (US)

(*) Notice: Subject to any disclaimer, the term of this patent is extended or adjusted under 35 U.S.C. 154(b) by 0 days.

(21) Appl. No.: 18/447,218

(22) Filed: Aug. 9, 2023

(65) Prior Publication Data

US 2024/0052608 A1 Feb. 15, 2024

Related U.S. Application Data

(60) Provisional application No. 63/371,094, filed on Aug. 11, 2022.

(51) Int. Cl.
*G09F 13/16* (2006.01)
*G09F 7/18* (2006.01)

(52) U.S. Cl.
CPC ...... *G09F 13/16* (2013.01); *G09F 2007/1804* (2013.01)

(58) Field of Classification Search
CPC .......... E01F 9/00; E03B 9/02; E04F 13/0736; G09F 3/0295; G09F 3/205; G09F 7/18; G09F 13/20; G09F 3/16; G09F 15/0037; G09F 2007/1804; Y10T 137/0318; Y10T 137/6851; Y10T 137/8158
USPC ......... 40/316, 607.01, 607.12; 116/200, 209; 404/6, 9, 13, 16; 137/1, 343, 551
See application file for complete search history.

(56) References Cited

U.S. PATENT DOCUMENTS

| | | | | | |
|---|---|---|---|---|---|
| 5,101,755 | A * | 4/1992 | Barrett | E01F 9/541 | 404/11 |
| 5,138,784 | A * | 8/1992 | Niwa | G09F 3/04 | 40/665 |
| D336,262 | S * | 6/1993 | O'Neal | D10/111 | |
| 5,771,835 | A * | 6/1998 | Schneider | G09F 11/23 | 52/103 |
| 5,776,558 | A * | 7/1998 | Wotton | A01M 29/06 | 40/660 |
| 6,061,940 | A * | 5/2000 | Rice | G09F 7/00 | 40/594 |
| 6,260,507 | B1 * | 7/2001 | Simpson | E03B 9/06 | 116/200 |
| 6,299,379 | B1 * | 10/2001 | Lewis | E01F 9/619 | 404/9 |
| 6,758,160 | B1 * | 7/2004 | Martin | E03B 9/06 | 340/331 |

(Continued)

OTHER PUBLICATIONS

Geograph Britain and Ireland, Andrew Tatlow, Fire hydrant sign, https://www.geograph.org.uk/photo/5453294 (Year: 2018).*

(Continued)

*Primary Examiner* — Kenneth Rinehart
*Assistant Examiner* — Jonathan J Waddy
(74) *Attorney, Agent, or Firm* — Budzyn IP Law, LLC

(57) ABSTRACT

In a first aspect of the subject invention, a reflective marker is provided for mounting to a utility pole or tree to indicate a location of a nearby fire hydrant, the marker including: a band having opposing inner and outer surfaces, the outer surface being light reflective with an icon provided thereon, wherein, the band is mountable to the utility pole or tree with the icon generally facing in the direction of the nearby fire hydrant.

10 Claims, 4 Drawing Sheets

(56) References Cited

U.S. PATENT DOCUMENTS

| | | | | |
|---|---|---|---|---|
| 7,059,266 | B1 * | 6/2006 | Burlando | E02B 3/20<br>137/272 |
| 8,607,488 | B2 * | 12/2013 | Johnston | G09F 15/0075<br>40/604 |
| 8,614,745 | B1 | 12/2013 | Al Azemi | |
| 9,135,836 | B2 * | 9/2015 | Benumof | G09F 7/18 |
| 10,253,468 | B1 | 4/2019 | Linville et al. | |
| 10,865,548 | B2 | 12/2020 | Ozburn | |
| 11,041,719 | B1 * | 6/2021 | Winter | G01C 15/06 |
| 2004/0200105 | A1 * | 10/2004 | Ng | G09F 13/20<br>40/607.01 |
| 2005/0244607 | A1 * | 11/2005 | Irvin | E04H 12/2292<br>428/99 |
| 2012/0261002 | A1 | 10/2012 | Sampson | |
| 2013/0008067 | A1 * | 1/2013 | DeMarco | G09F 15/0037<br>40/594 |
| 2014/0259567 | A1 * | 9/2014 | Colak | G09F 7/06<br>24/484 |
| 2015/0228212 | A1 * | 8/2015 | Bejian | G09F 3/12<br>40/607.13 |
| 2020/0063405 | A1 * | 2/2020 | Cohen | F16K 27/006 |

OTHER PUBLICATIONS

CPC Signs, Brite Max Utility View Reflectors, https://www.cpcsigns.com/proddetail.php?prod=Brite-Max-Utility-View-Reflective-Flexible-Bands (Year: 2024).*

Almetek Industries, Inc., Fire Hydrant Locator Marker, https://almetek.com/product/fire-hydrant-locator-marker/ (Year: 2024).*

Pixta, Stock Photo: Display sign of fire hydrant stuck to telephone pole, https://www.pixtastock.com/photo/36102600 (Year: 2024).*

South Coast Today, Scout project identifies hydrants, https://www.southcoasttoday.com/story/news/local/spectator/2010/02/03/scout-project-identifies-hydrants/51717052007/ (Year: 2010).*

SSP Direct, Custom Fire Hydrant Sign with channelling for sign post mounting 210x210mm, https://www.securitysafetyproducts.co.uk/security/safety-signs/custom-fire-hydrant-sign-with-channelling-for-sign-post-mounting-210x210mm.php (Year: 2024).*

Devon and Somerset Fire and Rescue Service, Fire hydrants, https://www.dsfire.gov.uk/safety/hydrants. (Year: 2022).*

Photograph taken by L. A. Budzyn in Tokyo, Japan in May 2023.

Screenshot taken from https://lemproductsinc.com/products/hydrant-rings, Aug. 3, 2022.

* cited by examiner

REFLECTIVE MARKER FOR INDICATING LOCATION OF A NEARBY FIRE HYDRANT

CROSS-REFERENCE TO RELATED APPLICATION

This application claims priority to U.S. Provisional Patent Appl. No. 63/371,094, filed Aug. 11, 2022, the entire contents of which is incorporated by reference herein.

FIELD OF THE INVENTION

The subject invention relates to reflective markers mountable to utility poles or trees.

BACKGROUND OF THE INVENTION

Speed of response is of critical importance in firefighting. The ability of firefighters to speedily reach a fire can save both lives and property. Response time is also affected by the ability to locate a fire hydrant. Darkness, snow, parked cars, and so forth, can impede visual contact with a fire hydrant, thereby causing a delay in fighting a fire.

Devices have been developed in the prior art to assist in visually locating a first hydrant. For example, products have been developed to be mounted onto a fire hydrant. LEM Products, Inc. of Montgomeryville, PA sells reflective rings mountable onto the outlet of a fire hydrant, being held by an outlet cap. U.S. Pat. No. 8,614,745 shows a battery-powered ring of light emitting diodes (LEDs) for mounting onto a bonnet of a fire hydrant. U.S. Pat. No. 10,865,548 shows a fire hydrant bonnet cover having a light reflective skirt. U.S. Published Patent Appl. No. 2012/0261002 shows a reflective collar mountable to a bonnet of a fire hydrant.

Road markers have been also developed where colored markers are fixed to a road surface in proximity to a fire hydrant. "Smart" versions of such road markers have been developed, such as that shown in U.S. Pat. No. 10,253,468.

The noted prior art devices have limitations, particularly, being susceptible to being obscured, e.g., being buried under snow. The prior art devices are limited in elevation, possibly having limited visibility.

It is noted that specially installed fire hydrant markers have been used also in the prior art. For example, in Japan, dedicated signposts have been installed colored red and supporting a sign indicating the presence of a fire hydrant. The signposts include an arrow which is radially adjustable about the signpost to indicate the general direction of a fire hydrant from the respective signpost. A distance indicator is also included to indicate the distance of the fire hydrant from the signpost. The signpost requires special installation and is not light reflective.

It is separately noted that light reflective markers are found in the prior art for mounting to utility poles. These are used to visually signal the presence of the utility pole, particularly in unlit areas, such as rural roads. The markers are strip shaped and located, screwed, or adhered to a utility pole. The markers are typically monochromatic with no identifying indicia or other insignia included.

SUMMARY OF THE INVENTION

In a first aspect of the subject invention, a reflective marker is provided for mounting to a utility pole or tree to indicate a location of a nearby fire hydrant, the marker including: a band having opposing inner and outer surfaces, the outer surface being light reflective with an icon provided thereon, wherein, the band is mountable to the utility pole or tree with the icon generally facing in the direction of the nearby fire hydrant.

In a further aspect of the subject invention, a method is provided of providing a visual indicator of a location of a fire hydrant, the method including: providing a band having opposing inner and outer surfaces, the outer surface being light reflective with an icon provided thereon; and, mounting the band to a utility pole or tree located nearby the fire hydrant, the band being mounted with the inner surface facing the utility pole or tree and with the icon being oriented to generally face in the direction of the fire hydrant.

With the subject invention, advantageously, a marker is provided which is mountable to a utility pole or tree separate from a fire hydrant to be visible, e.g., at an elevation higher than the fire hydrant. The icon provides directional guidance relative to the utility pole or tree to quickly locate a nearby fire hydrant.

As used herein, the term "fire hydrant" is a fixture which serves as a connection point from which firefighters can obtain water for fighting a fire. The term "fire hydrant" encompasses any fixture allowing for accessing water for firefighting, including, any version of dry barrel fire hydrant, wet barrel fire hydrant, fire plug, firecock, and standpipe. Both above-ground and below-ground designs are covered.

As used herein, the term "utility pole" is any column, post, pole, or the like, free-standing, to support lighting, electrical transformers, and/or public utility transmission lines, such as power lines, telephone lines, fiber optic cabling and so forth. "Utility poles" may be of any construction, including being wooden, plastic, fiberglass, concrete, metallic, or combinations thereof.

These and other features of the invention will be better understood through a study of the following detailed description and accompanying drawings.

DETAILED DESCRIPTION OF THE INVENTION

Figure 1:
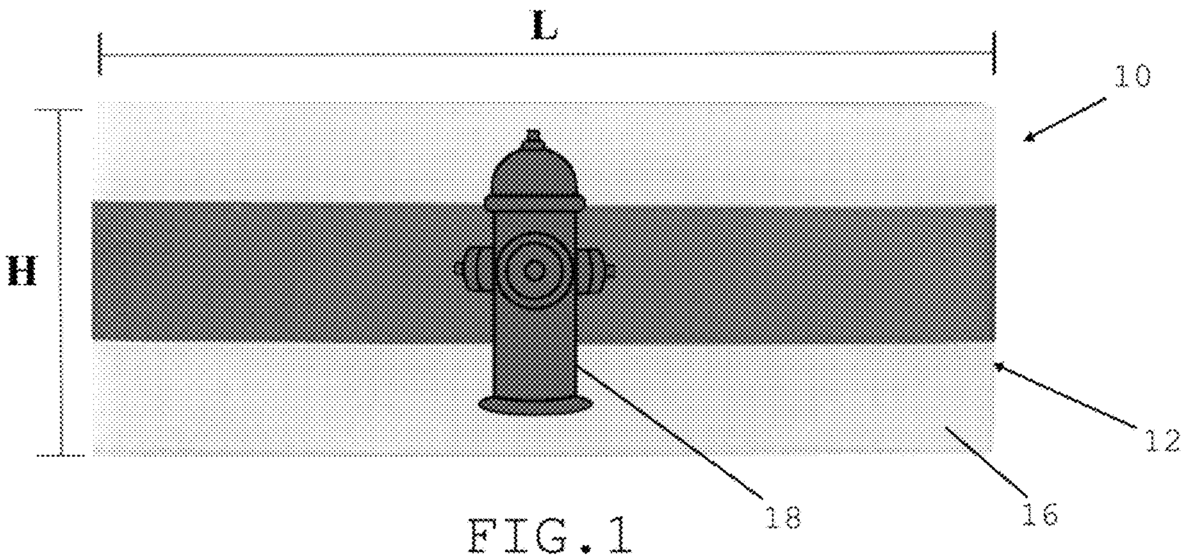
FIGS. 1-7 show a reflective marker formed in accordance with the subject invention; and, FIG. 8 shows two reflective markers formed in accordance with the subject invention in use.
Figure 2:
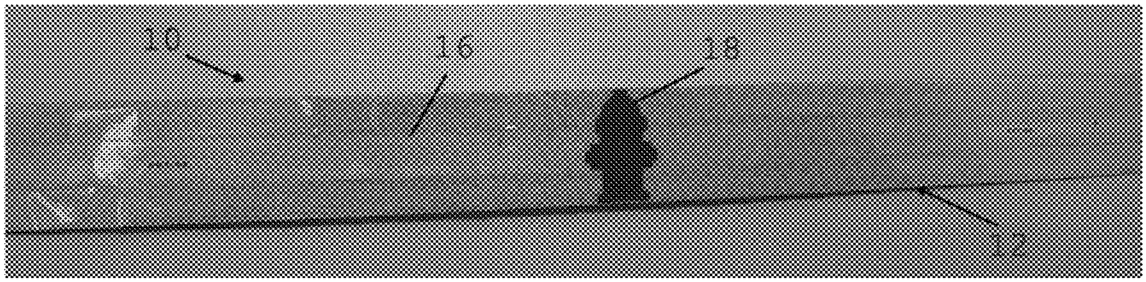
Figure 3:
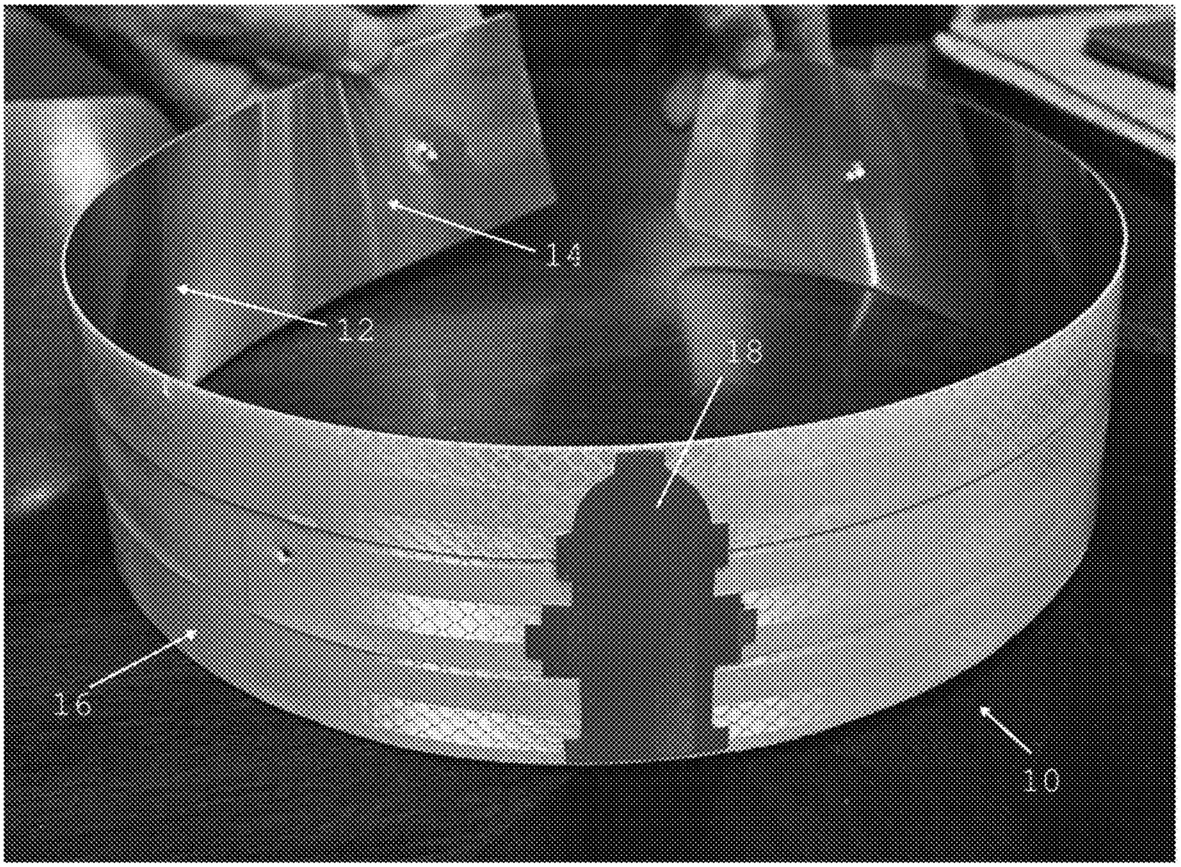
Figure 4:
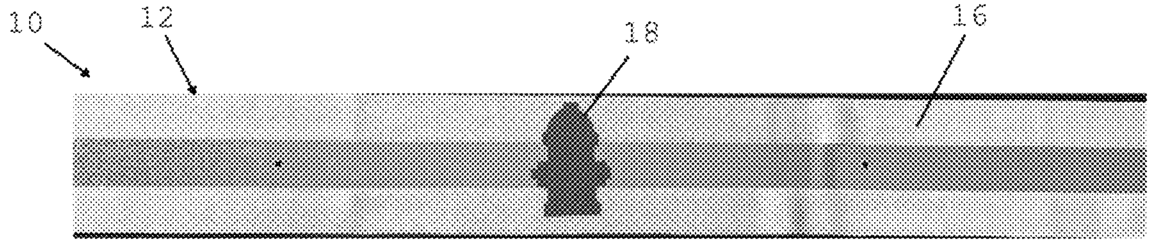
Figure 5:
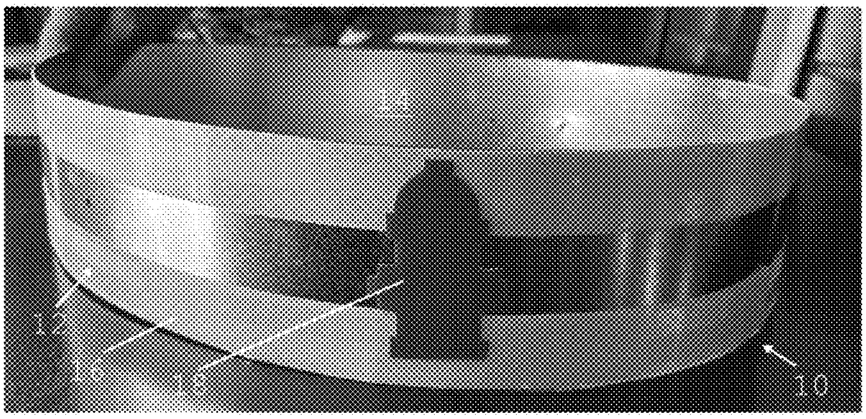
Figure 6:
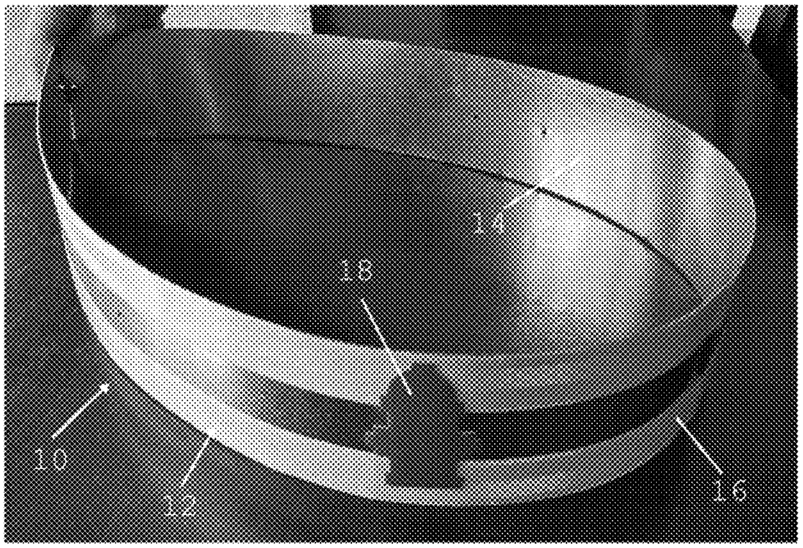
Figure 7:
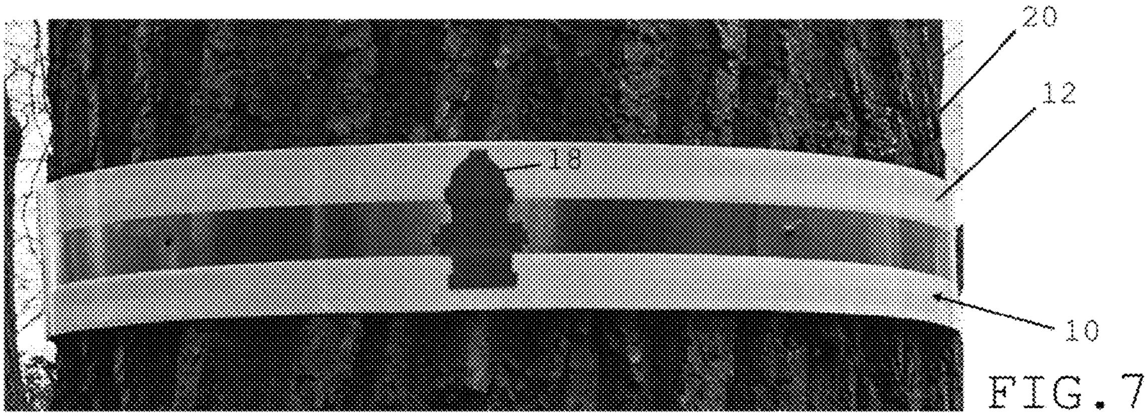

With reference to the Figures, a reflective marker 10 is shown which includes a band 12 having opposing inner and outer surfaces 14, 16. The outer surface 16 is light reflective with an icon 18 provided thereon. The band 12 is mountable to a utility pole or tree 20 with the icon 18 generally facing in the direction of a nearby fire hydrant 22.

The band 12 may be any material, including, but not limited to, one or more of: a textile, metal (e.g., aluminum), polymeric material (e.g., plastic sheeting), cellulosic material (e.g., cardboard), and combinations thereof. The band 12 may be strip-shaped having a length L greater than height H. The length L should be of sufficient length to extend across at least 25% of the circumference of the utility pole or tree 20, more preferably, to extend across at least 50% of the circumference of the utility pole or tree 20, further preferably, to extend across at least 75% of the circumference of the utility pole or tree 20. The length L of the band 12 allows for the reflective marker 10 to be seen from multiple locations radially spaced about the utility pole or tree 20. The band 12 may be configured to extend fully about the circumference of the utility pole or tree 20. With extending about the full circumference, the band 12 may have ends fastened to one another to provide tension in the band 12 when mounted. With the band 12 being less than the full circumference of the utility pole or tree 20, the band 12 may be mounted to the utility pole or tree 20 using any known method, including being nailed, screwed, bolted, adhered, tied (e.g., string, wire, or cord is used), pulled in tension (e.g., a strap, wire, or cord pulls together ends of the band 12), and combinations thereof. With full circumference mounting of the band 12, any of the aforementioned mounting methods may be likewise used.

The outer surface 16 may be prepared in any manner to provide light reflectiveness. For example, light reflective tape or strips may be applied to the outer surface 16 of the band 12. In addition, or alternatively, light reflective material or paint may be applied to the outer surface 16 of the band 12. Colors similar to those used with firefighter's clothing and equipment may be used, such as red, fluorescent yellow-green, fluorescent orange, and so forth. It is preferred that two or more colors be utilized for high visibility to avoid confusion with prior art monochromatic reflective markers used on utility poles. The two or more colors may be arranged in stripes (vertical, diagonal, and/or horizontal) and/or in other patterns. The colors may be arranged to alternate in a regular pattern, e.g., as a repeating striped pattern. For example, the outer surface 16 may include two outer fluorescent yellow-green stripes with a central white stripe.

Figure 8:
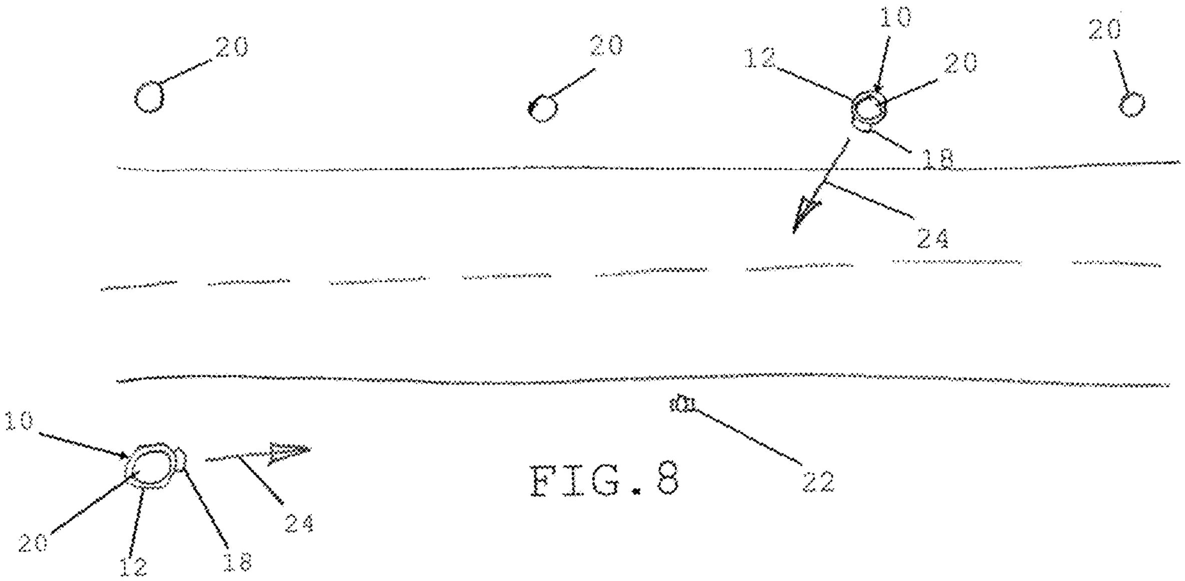

The icon 18 may be any graphic depiction associated with firefighting, emergency services, water, and the like. By way of non-limiting example, the icon 18 may be at least one of a: fire hydrant, flame, fireman's hat, drop of water, hose, and firetruck. The icon 18 acts as an indicator of direction by generally facing towards the nearby fire hydrant 22, as shown schematically by arrow 24 in FIG. 8. To mount, the band 12 is radially adjusted about the utility pole or tree 20 to have the icon 18 generally face the nearby fire hydrant 22, and then secured to fix the radial portion of the band 12. As will be appreciated by those skilled in the art, two or more of the bands 12 may be located on different utility poles or trees 20 about the nearby fire hydrant 22 to provide multiple points of reference, as shown in FIG. 8. This may be helpful with the bands 12 being located on both sides of a road directing to the nearby fire hydrant 22.

Alternatively, the icon 18 may be a number representing the distance from the relevant utility pole or tree 20 to the nearby fire hydrant 22. For example, the icon 18 may be the number "15," indicating that the nearby fire hydrant 22 is fifteen feet away from the utility pole or tree 20 in a direction in which the icon 18 is facing. In addition, the icon 18 may include any of the graphical depictions listed above (fire hydrant, flame, and so forth) and a number representing distance to the nearby fire hydrant 22.

Preferably, the icon 18 is light reflective. In addition, preferably, the icon 18 is provided in a color which is contrasting to the color of the outer surface 16 about the icon 18 so as to be visually distinguishable therefrom. For example, the icon 18 may be red with the outer surface 16 being fluorescent yellow-green and/or white (e.g., the outer surface 16 may include two outer fluorescent yellow-green stripers with a central white stripe).

The band 12 is preferably mounted at a height to be visually unobstructed by parked cars or other surrounding elements. Preferably, the band 12 is mounted to the utility pole or tree 20 at a height of at least four feet from the ground, which is higher than the height of a typical fire hydrant. The band 12 may be mounted even higher, e.g., eight feet or higher, to be visible at a greater distance and to minimize vandalism or theft. The band 12 advantageously acts as a reflective marker indicating presence of the utility pole or tree 20.

What is claimed is:

1. A method of providing a visual indicator of a location of a fire hydrant, the method comprising:

providing a band having opposing inner and outer surfaces, the outer surface being light reflective with only a single icon provided thereon, wherein the band is strip shaped having a length and a height, the length being greater than the height, wherein the single icon extends across a minor portion of the length and extends across at least a majority of the height; and, mounting the band to a utility pole or tree located nearby the fire hydrant, the band being mounted with the inner surface facing the utility pole or tree and with the single icon being oriented to generally face in the direction of the fire hydrant, wherein the band is mounted about the utility pole or tree with the length extending across at least a portion of the circumference of the utility pole or tree.

2. The method of claim 1, wherein the band is mounted to the utility pole or tree at a height of at least four feet from the ground.

3. The method of claim 1, wherein the single icon is a graphic depiction of at least one of a: fire hydrant, flame, fireman's hat, drop of water, hose, and firetruck.

4. The method of claim 1, wherein the single icon includes a number representing distance from the utility pole or tree to the nearby fire hydrant.

5. The method of claim 1, wherein the mounting the band includes one of more of: nailing, screw mounting, bolting, adhering, tying, and pulling into tension.

6. The method of claim 1, further comprising:

providing a second band having opposing inner and outer surfaces, the outer surface being light reflective with a single icon provided thereon; and, mounting the second band to a second utility pole or tree located nearby the fire hydrant, the second utility pole or tree being spaced from the utility pole or tree, the second band being mounted with the inner surface facing the second utility pole or tree and with the single icon of the second band being oriented to generally face in the direction of the fire hydrant.

7. The method of claim 6, wherein the second band is strip shaped having a second length and a second height, the second length being greater than the second height, wherein the single icon of the second band extends across a minor portion of the second length and extends across at least a majority of the second height.

8. The method of claim 1, wherein the length is sufficient to extend across at least 25% of the circumference of the utility pole or tree.

9. The method of claim 8, wherein the length is sufficient to extend across at least 50% of the circumference of the utility pole or tree.

10. The method of claim 9, wherein the length is sufficient to extend across at least 75% of the circumference of the utility pole or tree.

* * * * *